Dec. 30, 1969 V. M. MAIDL 3,487,449
CAMPER WITH EXTENSIBLE CANOPY
Filed April 25, 1968 2 Sheets-Sheet 1
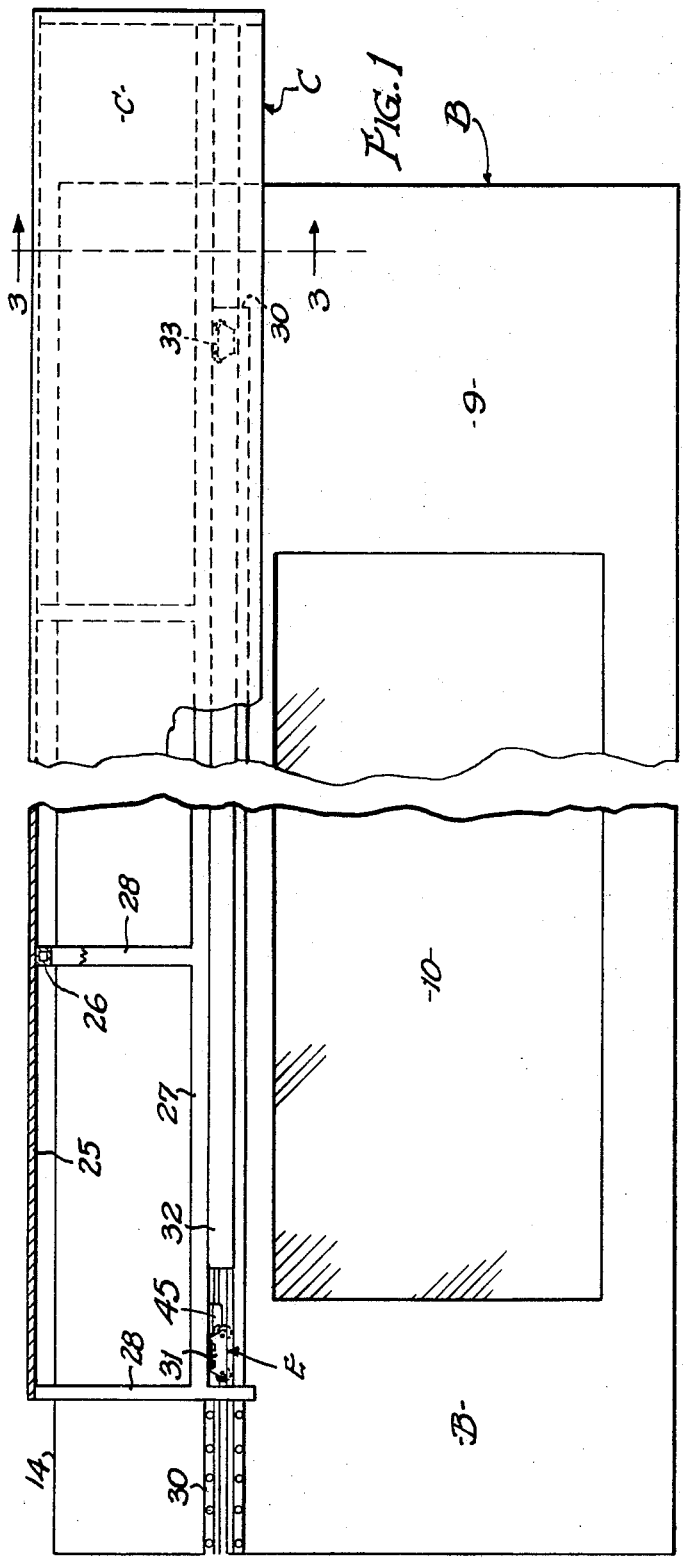
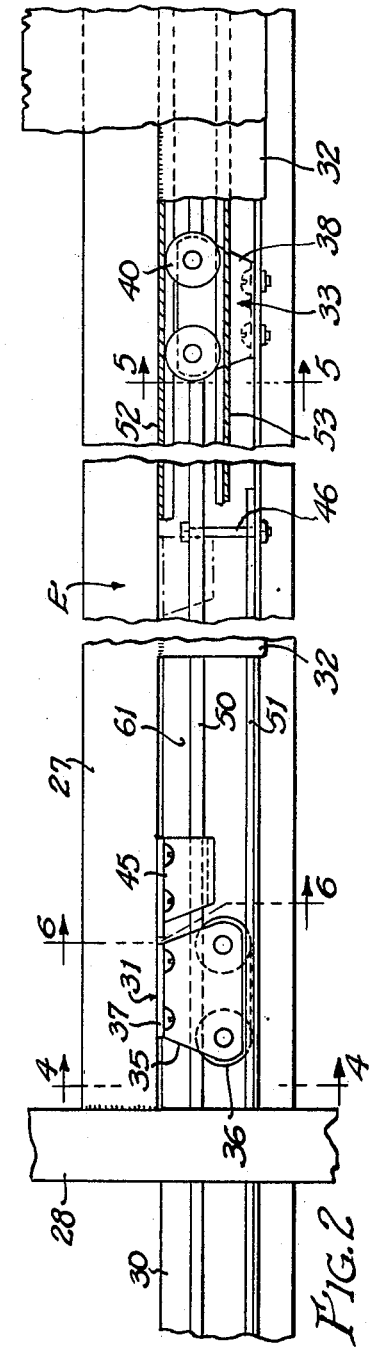
INVENTOR.
VIRGIL M. MAIDL
BY
-ATTORNEY-

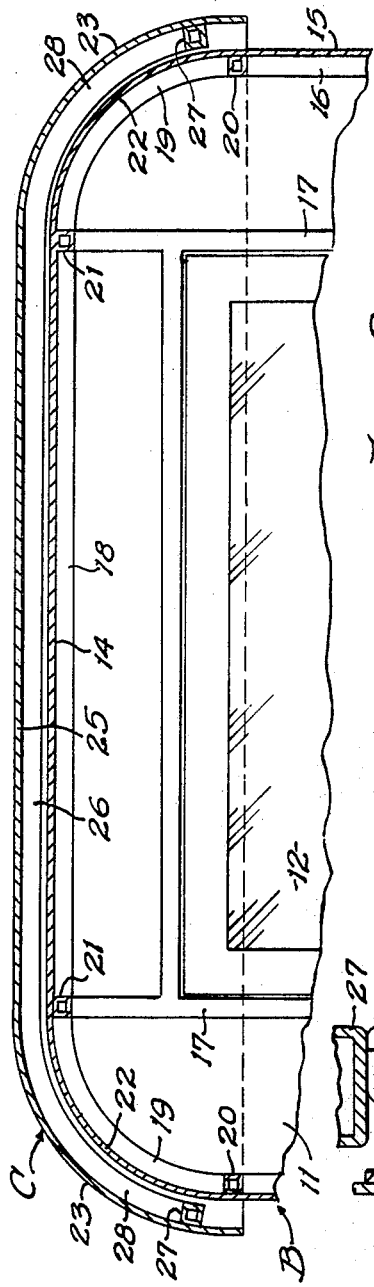
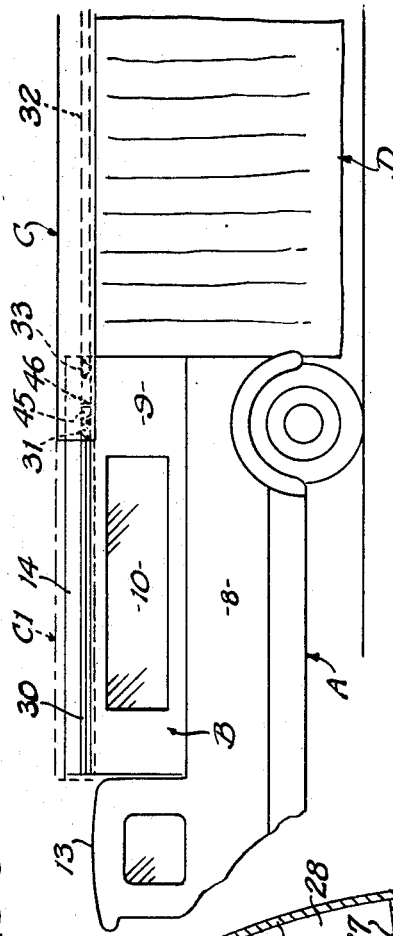
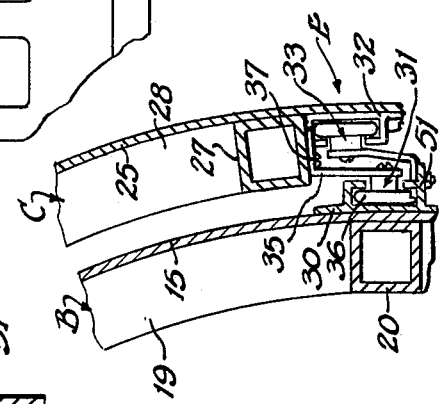
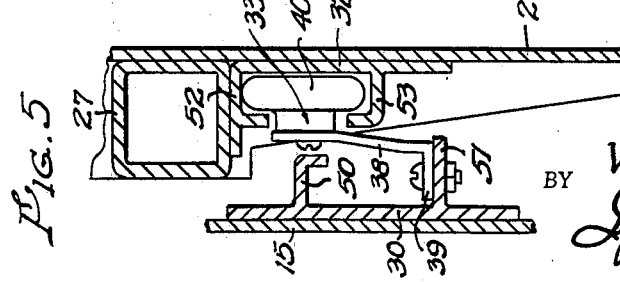
INVENTOR.
VIRGIL M. MAIDL
BY
Lynn H. Latta
-ATTORNEY-

United States Patent Office 3,487,449
Patented Dec. 30, 1969

3,487,449
CAMPER WITH EXTENSIBLE CANOPY
Virgil M. Maidl, 18331 Dos Casas Lane,
Yorba Linda, Calif. 92686
Filed Apr. 25, 1968, Ser. No. 724,064
Int. Cl. B60p 3/34
U.S. Cl. 296—23        9 Claims

ABSTRACT OF THE DISCLOSURE

Camper body with a canopy fitted to its roof and slidably extensible from a normal position covering the roof to a rearwardly-extended position sheltering an area behind the body.

BACKGROUND OF THE INVENTION

A camper of this general type is disclosed in my Patent No. 2,976,078, issued Mar. 21, 1961, and has been available on the market since that time. It has required the use of props to support the rear end of the canopy in the extended shelter position.

SUMMARY OF INVENTION

The present invention is characterized in that the canopy is cantilever-supported from the camper body in its extended shelter position, no supplementary support of its rear end being required, and the object of the invention is to eliminate the need for such supplementary support.

In the drawings:

FIG. 1 is a fragmentary side elevational view of a camper body embodying the invention, with portions broken away;

FIG. 2 is a fragmentary side elevational view of the roller support mechanism at one side;

FIG. 3 is a transverse vertical sectional view taken on line 3—3 of FIG. 1;

FIG. 4 is a transverse sectional view of the roller-support mechanism, taken on line 4—4 of FIG. 2;

FIG. 5 is a transverse sectional view of the roller-support mechanism, taken on line 5—5 of FIG. 2;

FIG. 6 is a cross sectional view on line 6—6 of FIG. 2, showing the limiting stops; and FIG. 7 is a side elevational view of a camper embodying the invention, with the canopy shown in extended position.

DESCRIPTION

Referring now to the drawings in detail, FIG. 7 illustrates the invention as embodied in a camper built onto a pickup truck A, the camper embodying a body B and a canopy C extensibly attached thereto by roller extension mechanism E embodying the invention, for movement from a position C1 shown in phantom, to the rearwardly extended position shown in full lines, in which it is cantilever-supported by the roller mechanism, covering a shelter space of substantial area behind the body B, sufficient to shelter a dining table, several camp chairs, or a bed. A draped skirt D may be hung from the side and rear margins of the canopy when weather is damp, or cold and windy, to further protect the occupants of the shelter space and the furniture therein.

Camper body B may be of generally conventional construction, open at the bottom so as to communicate with the truck bed 8, embodying side walls 9 with windows 10, rear end wall 11 (FIG. 3) with door 12, a front wall (not shown) adjacent the truck's cab 13, and a roof 14. Body B is fabricated of a frame covered by a skin 15 of aluminum sheet or equivalent, the frame comprising vertical studs 16 and 17, roof bows 18 including arcuate side members 19, and longitudinal rails 20 and 21 connecting the studs and bows. Roof 14 is of vaulted form, with downwardly curved eave members 22.

Canopy C is an inverted channel form, with downwardly curved wings 23. It embodies a frame covered by skin 25 which can be of the same material as body skin 15. The frame is composed of bows 26 connected by longitudinal bars 27, the bows 26 having arcuate side portions 28 conforming to the curvature of the curved side portions of roof skin 15 and spaced therefrom with clearance such as to avoid any contact between the canopy and the roof during sliding movement of the canopy. The longtiudinal bars 27 are spaced upwardly from the lower side margins of the canopy so as to provide space for the roller extension mechanism as will now be described.

Roller extension mechanism E (FIGS. 1 and 2) includes a pair of fixed tracks 30 attached to the side walls 9 opposite the longitudinal rails 20, from which they derive strong support to resist the high levering loads that are imposed upon them when contributing to the cantilever cupport of the canopy C in its fully extended position (FIG. 5). Laterally opposed roller 31 units (FIGS. 2 and 4) one on each side of the canopy, are secured to the respective canopy frame members 27. Fixed roller units 33, secured to respective sides 9 of the body B, are rollingly coupled into tracks 32, which roll upon the units 33 as the canopy C is extended and retracted. Each roller unit 31 comprises a bracket 35 and a pair of rollers 36. Bracket 35 has a bent flange 37 secured to the underside of a canopy side frame member 27 and extends downwardly therefrom, inwardly of the vertical plane of the respective fixed roller unit 33 (FIG. 4). Roller units 33 which are in inverted relation to roller units 31, embody respective brackets 38 (FIG. 5) provided with a bent flange 39 secured to a respective fixed track 30, and a pair of rollers 40 received in moving tracks 32.

Tracks 32 extend the full length of canopy C (FIG. 7). Roller support units 33 are located adjacent the rear end of body B. In the fully extended position of the canopy, roller units 31 are located forwardly of units 33 a minor portion of the length of body B (e.g. 2 feet or slightly more). They are prevented from approaching more closely to roller units 33 by engagement of moving stops 45 on canopy C (FIG. 2) against fixed stops 46 on track 31. Moving stops 45 are located immediately behind travelling roller units 31, and fixed stops 46 are located about two feet from fixed roller units 33.

Each track 30 is generally of C-section for a majority of its length, embodying opposed upper and lower roller channels 50 and 51 (FIGS. 6 and 5) having respective opposed roller-retaining flanges and receiving rollers 36. The flange of lower channel 51 is cut away short of the fixed stop 46 (FIG. 2) to leave its bottom full width as a base to which fixed roller unit 33 is mounted. Each track 32 embodies similar roller channels 52, 53 receiving rollers 40. Tracks 32 extend from the rear end of canopy C to points just short of moving stops 45, leaving spaces in which moving stops 45 and roller units 31 are mounted directly to canopy side bars 27.

As shown in FIGS. 4, 5 and 6, tracks 30 and 32 are spaced apart laterally, their open sides facing one another. Stops 45, 46 and roller brackets 35, 38 are received in the spaces between the tracks. Fixed stops 46 may consist of bolts piercing the upper and lower rails 50 and 51 of tracks 31. Moving stops 45 are in the form of Z-brackets each having a top flange secured to a respective canopy rail 27, an intermediate web projecting downwardly in a plane between fixed and movable tracks 30 and 32, and a finger 55 projecting into the space between tracks 50 and 51, so that its path of movement is intersected by bolt 46. The tracks 30, 32 have broad backs which are securely attached, by riveting or welding or other equivalent means, to the skins 15 and 25 of body B and canopy C respectively. Tracks 30 are backed up by body rails 20. Tracks 32 are abutted and braced against canopy side members 27. Thus ample support is provided by the roller units in the cantilever extended position of the canopy, where the leverage exerted by the canopy against the roller supports is high.

OPERATIONS

Normally canopy C is in full covering relation to the roof 14 of body B, as indicated in phantom in FIG. 7. It can be extended easily by pushing rearwardly against its forward end, the roller units 31 travelling in fixed tracks 30 and the moving tracks 32 riding on fixed roller units 33 until moving stops 45 come up against fixed stops 46, when the canopy will be fully extended as shown in full lines in FIG. 7. A shelter space behind the camper body B will then be provided, the space being shaded from the sun and sheltered from light rains. Draperies D may be then hung from the side and rear margins of the canopy, if desired, to enclose the sheltered space for sleeping quarters, or to exclude cool breezes and dampness.

The overlap of the forward end of the canopy and the rear end of the body B is adequate to provide cantilever support for the projecting portion of the canopy, without props or other auxiliary support. The inverted channel form and downwardly-arched side wings 23 of the canopy rigidify the canopy longitudinally for its cantilevered self-support in the extended position so that no prop is required to support its extended rear end.

Movable tracks 32 terminate short of the forward end of canopy C. Stops 45 are spaced forwardly from the forward ends of tracks 32 to provide spaces 61 adapted, in the fully extended position of the canopy C, to receive the fixed stop-bolts 46, to permit their removal and to then receive the fixed roller units 33 (the canopy having meanwhile been shifted slightly farther to the rear) and to permit the release of roller units 33 from the canopy through spaces 61 by lifting the front end of the canopy away from roller units 33.

I claim:
1. In a camper:
   a body including a roof;
   a canopy having a normal position covering said roof, said canopy being of inverted channel form with downwardly extending wings at its respective sides;
   and means supporting said canopy on said body for extension from said normal position to an extended one in which, for a majority of its length it is projected beyond the rear end of said body to shelter an area behind the body, said supporting means comprising:
   a pair of fixed tracks secured to respective sides of said body near said roof, externally thereof;
   a pair of movable roller support units attached internally to said canopy wings near the forward ends thereof and rollingly engaged with said fixed tracks;
   a pair of fixed roller support units mounted on respective fixed tracks near the rear end of said body, said tracks transmitting support from said body to said units;
   a pair of movable tracks secured internally to said canopy wings in laterally opposed relation to said fixed roller support units and rollingly supported thereon;
   and stop means on said body and canopy interengageable to limit rearward extension of said canopy at said extended position wherein said fixed and movable roller support units are separated by a minor portion of the length of said canopy, said roller support units and tracks cooperating in said extended position to provide cantilever support for the major portion of said canopy projecting beyond the rear end of the said body.

2. A camper as defined in claim 1, wherein said tracks have track portions of C-section embodying vertically opposed rails with lateral retainer flanges, said track portions having open sides in laterally spaced, opposed relation, said roller support units having respective rollers confined between said rails and retained in said track portions by said retainer flanges.

3. A camper as defined in claim 2, wherein the retainer flanges of the lower rails of said fixed tracks are terminated short of said fixed roller units;
   said fixed roller units including brackets secured to portions of said lower rails projecting beyond the ends of said lower rail flanges, said brackets projecting upward between the opposed track portions and carrying their respective rollers at their upper ends.

4. A camper as defined in claim 3, wherein said stop means includes stops secured to said lower rails adjacent said fixed roller units and projecting upwardly between said opposed track portions.

5. A camper as defined in claim 4, wherein said stop means further includes movable stops secured to said canopy wings adjacent to and forwardly of said movable roller units, said movable stops and roller units projecting downwardly between the opposed track portions.

6. A camper as defined in claim 1, wherein said canopy includes a frame embodying longitudinal side bars and a covering skin;
   said movable tracks being disposed beneath and abutted against said said bars so as to transmit support to said canopy through said side bars.

7. A camper as defined in claim 1, wherein said canopy includes a frame embodying longitudinal side bars and a covering skin;
   said movable tracks being disposed beneath and abutted against said side bars so as to transmit support to said canopy through said side bars;
   said movable tracks terminating short of the forward ends of said wings;
   said movable roller units embodying brackets secured to the undersides of said side bars forwardly of said movable tracks and projecting downwardly therefrom between the vertical planes of the opposed track portions.

8. A camper as defined in claim 1, wherein said canopy includes a frame embodying longitudinal side bars and a covering skin;
   said movable tracks being disposed beneath and abutted against said side bars so as to transmit support to said canopy through said side bars;
   said stop means including movable stops secured to the undersides of said side bars and projecting downwardly therefrom;
   said movable tracks terminating at points spaced rearwardly from said movable stops to provide gaps through which said fixed roller units may be released from said movable tracks to permit upward removal of said canopy from said body.

9. A camper as defined in claim 1;
said roof being of vaulted form including downwardly arched eave portions;
said body comprising a frame including longitudinal side members near the lower extremities of said eave portions, and a covering skin;
said fixed tracks being secured to said body skin in registering relation to said side members and supported thereby.

References Cited

UNITED STATES PATENTS

| | | | |
|---|---|---|---|
| 3,067,813 | 12/1962 | Henatsch | 160—202 X |
| 2,976,078 | 3/1961 | Maidl | 296—26 |

PHILIP GOODMAN, Primary Examiner

U.S. Cl. X.R.

52—64